United States Patent [19]
Wetherell

[11] Patent Number: 4,723,315
[45] Date of Patent: Feb. 2, 1988

[54] POLARIZATION MATCHING MIXER

[75] Inventor: William B. Wetherell, Stoneham, Mass.

[73] Assignee: Itek Corporation, Lexington, Mass.

[21] Appl. No.: 878,052

[22] Filed: Jun. 24, 1986

[51] Int. Cl.$^4$ .............................................. H04B 9/00
[52] U.S. Cl. ........................................ 455/619; 370/2
[58] Field of Search ............... 455/606, 607, 617, 619, 455/615, 616; 370/2; 329/144; 250/214 A, 214 AG; 330/59, 308

[56] References Cited

U.S. PATENT DOCUMENTS

| | | | |
|---|---|---|---|
| 3,694,656 | 9/1972 | Henning | 329/144 |
| 4,506,388 | 3/1985 | Monerie et al. | 455/614 |

FOREIGN PATENT DOCUMENTS

| | | | |
|---|---|---|---|
| 59-122140 | 7/1984 | Japan | 370/2 |
| 60-172842 | 9/1985 | Japan | 455/619 |

Primary Examiner—Joseph A. Orsino, Jr.
Attorney, Agent, or Firm—Michael H. Wallach; Robert F. Rotella

[57] ABSTRACT

A method of mixing light from a signal source with light from a local oscillator for heterodyne or homodyne detection using differential detection techniques is described. In the method and apparatus of the invention, incoming light is matched to the polarization of the local oscillator no matter what the polarization of the incoming light is. A sequence of three polarization beamsplitters is utilized to achieve this match. The local oscillator signal and the incoming signal are incident on separate faces of a first polarization beamsplitter. Each is divided into two beams by that beamsplitter and paired with the orthogonally polarized component of the other, each signal/local oscillator pair exiting from one exit face of the first polarization beamsplitter. The second polarization beamsplitter resolves one of these pairs into sum and difference pairs of matched polarization which interfere and are detected by square law detectors, forming currents which are subtracted in a differential amplifier. The third polarization beamsplitter repeats this process with the other pair of beams from the first polarization beamsplitter. The result is two net output currents which between them contain all the phase and amplitude information needed to define and control the polarization of the incoming signal. In addition to reducing sensitivity to the polarization state of the incoming signal, the use of polarization beamsplitters substantially improves optical efficiency, in comparison to prior art using amplitude beamsplitters.

17 Claims, 16 Drawing Figures

POLARIZATION MATCHING MIXER

BACKGROUND OF THE INVENTION

A glossary is provided below of the terms used in connection with the invention described herein.

ABS=Amplitude beamsplitter.
D=Sensitivity and gain of square-law detector.
$D^2$=Square-law detector.
DA=Differential amplifier.
DL=Delay line.
$\vec{E}$=Electric field vector of signal light beam ($\vec{E}=\vec{E}_x+\vec{E}_y$).
i=Electric current.
$\vec{L}$=Electric field vector of local oscillator light beam ($\vec{L}=\vec{L}_x+\vec{L}_y$).
P=Polarizer (absorbs or reflects the orthogonal polarization.)
PBS=Polarization beamsplitter.
PMM=Polarization matching mixer.
PS=Phase shifter (changes phase $\delta$ between x- and y-components of $\vec{E}$).
R=Rotator (half-wave retarder used to rotate polarization vector.)
S=Output signal (usually in decibles.)
T=Amplitude throughput (can be transmittance or reflectance.)
U=Amplitude transmittance.
V=Amplitude reflectance.
$\alpha$=Arc tan $A_y/A_x$, where $A_x$ and $A_y$ are amplitude components ($0 \leq \alpha \leq 90°$).
$\delta$=Fixed phase term in frequency argument of field vector ($-\pi \leq \delta > \pi$).
$\omega$=Optical frequency in radians per second ($\omega_E$ and $\omega_L$).

The superscript arrow ($\rightarrow$) indicates an electromagnetic vector quantity containing the time-dependent term cos ($\omega t + \delta$).

The signal from a modulated beam of light $\vec{E}$ may have any polarization state, and may be represented by its x- and y-components, $$\vec{E}_x = \vec{E} \cos \alpha_E = E \cos \alpha_E \cos (\omega_E t + \delta_{Ex})$$

and $$\vec{E}_y = \vec{E} \sin \alpha_E = E \sin \alpha_E \cos (\omega_E t + \delta_{Ey}). \quad (1)$$

The polarization state is defined by $\delta = \delta_{Ex} - \delta_{Ey}$ and $\alpha_E$. If $\delta = 0$ or $\pi$, the light is linearly polarized for all values of $\alpha_E$. If $\delta = \pm \pi/2$ and $\alpha_E = 45°$, the light is circularly polarized. Any other combination of $\delta$ and $\alpha_E$ indicates elliptically polarized light. Equation (1) represents the signal carrier. The data signal modulation may appear on E, $\omega_E$ or $\delta$.

Coherent detection of modulated light requires the mixing of the signal beam $\vec{E}$ with a local oscillator beam $\vec{L}$ in such a way that the two wavefronts are parallel to within a small fraction of a wave and the polarization vector match. The local oscillator $\vec{L}$ is linearly polarized ($\delta_{Lx} = \delta_{Ly} = \delta_L$) in the preferred embodiments of this invention, and it will be so assumed during the description. Other forms of polarization are possible, so long as $\vec{E}$ and $\vec{L}$ are orthogonal or matching where called for in the description. The local oscillator may be represented by its x- and y-components, $$\vec{L}_x = \vec{L} \cos \alpha_L = L \cos \alpha_L \cos (\omega_L t + \delta_L)$$

and $$\vec{L}_y = \vec{L} \sin \alpha_L = L \sin \alpha_L \cos (\omega_L t + \delta_L). \quad (2)$$

The local oscillator frequency $\omega_L$ will differ from $\omega_E$ for heterodyne detection, and will match $\omega_E$ for homodyne detection. In most cases, $\alpha_L$ will be either 0° or 45°.

The signal beam resulting from mixing $\vec{E}$ and $\vec{L}$ is focussed on a square-law detector whose output current i is proportional to the intensity (square of the amplitude) of the incident light:

$$i = D(\vec{E} + \vec{L})^2 \quad (3)$$
$$= D(\vec{E}^2 + \vec{L}^2 + 2\vec{E}\vec{L});$$

where D is a constant proportional to the product of the sensitivity and gain of the detector. The term $2\vec{E}\vec{L}$ may be expanded to give $$2\vec{E}\vec{L} = 2EL \cos (\omega_E t + \delta_E) \cos (\omega_L t + \delta_L) \quad (4)$$
$$= EL \cos [(\omega_E + \omega_L)t + (\delta_E + \delta_L)] + EL \cos [(\omega_E - \omega_L)t + (\delta_E - \delta_L)]$$

Only the difference frequency $\omega_E - \omega_L$ is of interest for heterodyne and homodyne detection. The sum frequency component $\omega_E + \omega_L$ is therefore eliminated by filtering. The net output current is thus $$i = D\{\vec{E}^2 + \vec{L}^2 + EL \cos [(\omega_E - \omega_L)t + (\delta_E - \delta_L)]\} \quad (5)$$

The ultimate measure of performance in an optical system of this type is signal-to-noise ratio. Noise arises from a number of sources, one of which is photon shot noise, the statistical variation of the arrival time and detection of photons in a nominally uniform beam of light. In heterodyne and homodyne detection devices, the local oscillator is usually strong enough so that photon shot noise is the dominant noise source. All terms in equation (5) contribute to photon shot noise, but only the difference frequency term contributes to signal. Since $\vec{E}^2$ and $\vec{L}^2$ contribute only to noise, they will be eliminated by differential detection.

In differetial detection, $\vec{E}^2$ and $\vec{L}^2$ are eliminated by splitting $\vec{E}$ and $\vec{L}$ equally, forming $\vec{E}_+$, $\vec{E}_-$, $\vec{L}_+$ and $\vec{L}_-$, and sending them in pairs to two square-law detectors, one detector seeing the sum pair $\vec{E}_+ + \vec{L}_+$, the other seeing the difference pair $\vec{E}_- - \vec{L}_-$. This produces two signal currents $i_+$ and $i_-$, $$i_+ = D_+\{\vec{E}_+^2 + \vec{L}_+^2 + E_+ L_+ \cos [(\omega_E - \omega_L)t + (\delta_E - \delta_L)]\} \quad (6)$$

$$i_- = D_-\{\vec{E}_-^2 + \vec{L}_-^2 - E_- L_- \cos [(\omega_E - \omega_L)t + (\delta_E - \delta_L)]\} \quad (7)$$

If $D_+ = D_- = D$, $E_+ = E_- = E_d$ and $L_+ = L_- = L_d$, subtracting $i_-$ from $i_+$ in a differential amplifier cancels the $\vec{E}^2$ and $\vec{L}^2$ terms, leaving a net current $$i = i_+ - i_- = 2DE_d L_d \cos [(\omega_E - \omega_L)t + (\delta_E - \delta_L)] \quad (8)$$

The difference frequency $\omega_i = \omega_E - \omega_L$ is usually referred to as the intermediate frequency in describing heterodyne detector systems. In homodyne detector systems, $\omega_L = \omega_E$, so that $\omega_i = 0$. In this case, equation (8) takes the special form $$i = 2DE_d L_d \cos(\delta_E - \delta_L) \tag{8'}$$

In heterodyne detection, the intermediate frequency $\omega_i$ forms a radio frequency carrier which is processed by standard radio frequency demodulation techniques to extract the data signal. In homodyne detection, the data signal is obtained directly from the detector output current.

In both heterodyne and homodyne detection, the signal current passes through a resistive load r, generating a voltage v, where $v = ir$. The signal S used in signal-to-noise ratio calculations is the power generated by this process, $S = vi = i^2 r$. The electronic processing by which the signal is extracted is not the subject of this invention beyond the extent to which it is described herein. In using the signal S to compare performance of the apparatus of this invention to prior art, the signal S will be given by $$S = 4CD^2 E_d^2 L_d^2 \tag{9}$$

where C is a constant representing electronic signal processing, C being assumed to be the same for all systems being compared, unless otherwise noted. The quantity $4E_d^2 L_d^2$ is the quantity of interest for optical performance comparisons, since it is affected by the throughput efficiency of the optical collecting system, which the apparatus of this invention is intended to improve. Note that this quantity is the same whether heterodyne of homodyne detection is used.

Figure 1:
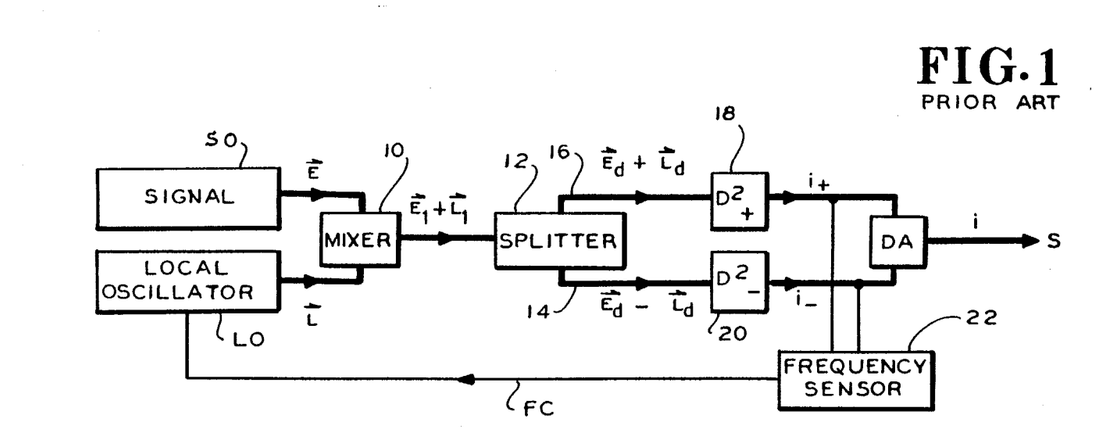
FIG. 1 is a block diagram of a generic system of coherent detection of light using heterodyne or homodyne detection and differential detection.

FIG. 1 is a block diagram representing the generic principals of the mixing and splitting technique currently used for detecting light coherently by heterodyne and homodyne differential detection. The modulated signal $\vec{E}$ and local oscillator signal $\vec{L}$ enter the mixer 10 from the signal source SO and local oscillator LO, and produce an output $\vec{E}_1 + \vec{L}_1$. $\vec{E}_1$ and $\vec{L}_1$ are linearly polarized in orthogonal directions, and in general their amplitudes $E_1$ and $L_1$ will be reduced. A splitter 12 receives and divides the signal and local oscillator into two equal pairs $\vec{E}_d$ and $\vec{L}_d$. In the process, a phase shaft of 180° is added to $\delta_L$ for the difference channel (line 14). This is equivalent to changing the signal of $\vec{L}_d$, so that in the difference channel, $\vec{L}_d$ is subtracted from $\vec{E}_d$, and in the sum channel (line 16), $\vec{L}_d$ is added to $\vec{E}_d$. The square law detector $D^2_+$ (18) detects the mixed light signal in the sum channel, producing the current $i_+$. The square law detector $D^2_-$ (20) detects the mixed light signal in the difference channel, producing the current $i_-$. The detector output currents $i_+$ and $i_-$ are subtracted in the differential amplifier DA to produce the net output current i.

In the typical optical communications system, the signal oscillator SO is a remotely located device whose frequency cannot be relied on to have the exact value needed to match the frequency of the local oscillator LO for homodyne detection, or to produced the desired intermediate frequency $\omega_i$ for heterodyne detection. It is therefore necessary to control LO to match the frequency of the local oscillator signal $\vec{L}$ to the value required for homodyne or heterodyne detection of the incoming signal $\vec{E}$. To do this, portions of $i_+$ and $i_-$ are split off and fed to frequency sensor 22. In this device, the signal currents are passed through narrow bandpass filters to strip the data signal, allowing the intermediate frequency $\omega_i$ to be extracted. This is used to generate a frequency control signal FC, which is fed to the local oscillator. This feature is common to all coherent detection systems discussed here and does not enter directly into optical efficiency calculations.

Figure 2:
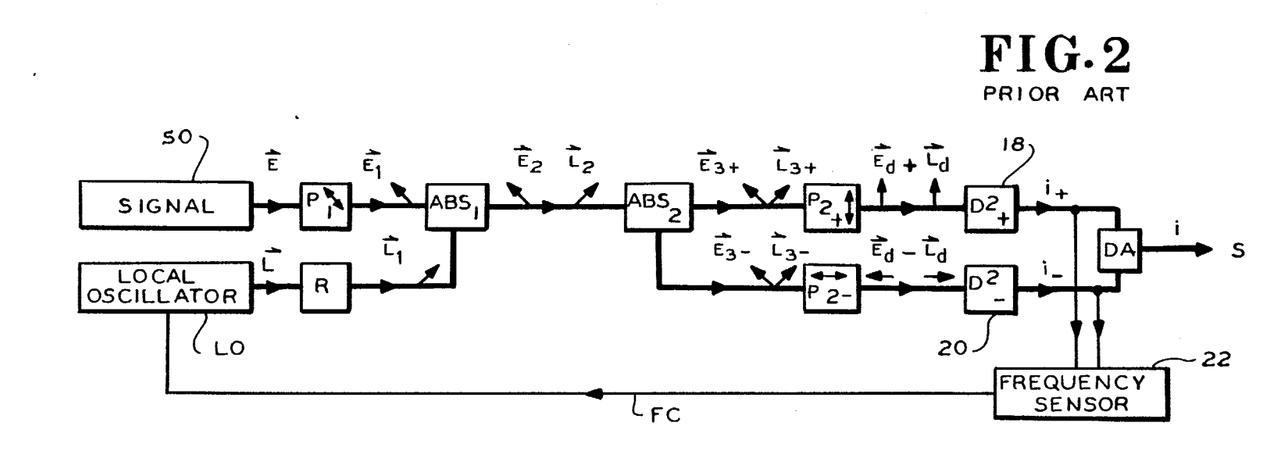
FIG. 2 is a block diagram of a prior art system of coherent detection of light as set forth in U.S. Pat. No. 3,649,656.

FIG. 2 represents prior art in the form of Henning's Balanced Optical Demodulator, U.S. Pat. No. 3,694,656. In FIG. 2, a first amplitude beamsplitter (ABS$_1$) is used to mix and split the signal $\vec{E}$ from SO and the local oscillator $\vec{L}$ from LO. (An amplitude beamsplitter is a device which divides the amplitude of the light incident on it into two components, one of which is reflected, and the other transmitted. The ABS may be a thin metallic coating on a glass substrate, or it may be a multilayer dielectric coating on a glass substrate.) Prior to mixing, the signal $\vec{E}$ first passes through a polarizer P$_1$ to eliminate components which cannot interfere with the local oscillator. As a result, $\vec{E}_1 = \vec{E} \cos \alpha_E$, where $\alpha_E$ is measured relative to the polarization axis of P$_1$. $\vec{L}$ passes through a rotator R which rotates its polarization vector so that $\vec{L}_1$ is polarized orthogonal to $\vec{E}_1$. The losses associated with rotation by R are small enough so that one may assume that $\vec{L}_1 = \vec{L}$. (Losses associated with glass path and air-glass interfaces will be ignored in comparing the present invention to prior art, since they are small in comparison to other factors which will be considered, and they are roughly equal in all systems under consideration.)

ABS$_1$ is characterized by an amplitude transmittance U$_1$ and amplitude reflectance V$_1$. Thus the outputs of ABS$_1$, i.e. $\vec{E}_2$ and $\vec{L}_2$, are as follows: $\vec{E}_2 = U_1 \vec{E} \cos \alpha_E$ and $\vec{L}_2 = V_1 \vec{L}$, and $\vec{E}_2$ and $\vec{L}_2$ are orthogonally polarized. Note that the small arrows above the lines in FIG. 2 represent the polarization direction as seen looking toward the source.

The orthogonally polarized signals $\vec{E}_2$ and $\vec{L}_2$ are coupled to ABS$_2$, which is characterized by amplitude transmittance U$_2$ and amplitude reflectance V$_2$. After passing through ABS$_2$, $\vec{E}_2$ and $\vec{L}_2$ are broken up into a sum pair $\vec{E}_{3+}$ and $\vec{L}_{3+}$, and a difference pair, $\vec{E}_{3-}$ and $\vec{L}_{3-}$, where $\vec{E}_{3+} = \vec{E} U_1 U_2 \cos \alpha_E$, $\vec{L}_{3+} = \vec{L} V_1 U_2$, $\vec{E}_{3-} = \vec{E} U_1 V_2 \cos \alpha_E$ and $\vec{L}_{3-} = \vec{L} V_1 V_2$. Each pair is passed through a respective polarizer (P$_{2+}$ or P$_{2-}$) which will transmit components of each pair which can interfere with each other. These components ae polarized at 45° to the initial polarization of $\vec{E}_3$ and $\vec{L}_3$, so the amplitude of each will be reduced by cos 45°. The effects of P$_{2+}$ and P$_{2-}$ on phase are more important: P$_{2+}$ adds $\pi/2$ to $\delta_{L+}$ and subtracts $\pi/2$ from $\delta_{E+}$, which rotates the field vectors toward each other; P$_{2-}$ subtracts $\pi/2$ from $\delta_{L-}$ and adds $\pi/2$ to $\delta_{E-}$, which rotates the field vectors away from each other. As a result, at a point in time when $\vec{E}_{d+}$ and $\vec{L}_{d+}$ have the same sign, and thus add, $\vec{E}_{d-}$ and $\vec{L}_{d-}$ have the opposite sign, and thus subtract.

Thus there are two mixed fields incident on each detector, $$\vec{E}_{d+} = \vec{E} U_1 U_2 \cos 45° \cos \alpha_E \tag{10}$$

$$\vec{L}_{d+} = \vec{L} V_1 U_2 \cos 45° \tag{11}$$

incident on $D^2_+$, and $$\vec{E}_{d-} = \vec{E} U_1 V_2 \cos 45° \cos \alpha_E \tag{12}$$

$$\vec{L}_{d-} = \vec{L} V_1 V_2 \cos 45° \tag{13}$$

incident on $D^2_-$. With equal detector sensitivities D, the condition for difference detection is that $\vec{E}_{d+} = \vec{E}_{d-} = \vec{E}_d$ and $\vec{L}_{d+} = \vec{L}_{d-} = \vec{L}_d$. Equations (10)–(13) show the condition for this to be $U_2 = V_2$. Comparison to equations (8) and (9) indicates that $U_1{}^2V_1{}^2$ will appear in the signal level. Since $U^2+V^2=C_t\leq 1.0$ for all ABSs, it can be shown that the maximum signal level will be achieved when $U_1=V_1$. Assume that $U_1=V_1=U_2=V_2=T$. Then $U^2+V^2=2T^2=C_t\leq 1.0$, and it follows $T\leq 2^{-\frac{1}{2}}$.

By analogy to equations (3) through (9), the output current i from DA for FIG. 2 is $$i=2DELT^4 \cos^2 45° \cos \alpha_E \cos[(\omega_E-\omega_L)t+(\delta_E-\delta_L)] \quad (14)$$

and the signal S is $$S=4CD^2E^2L^2T^6 \cos^4 45° \cos^2 \alpha_E \leq (CD^2E^2L^2 \cos^2 \alpha)/16 \quad (15)$$

There are two factors degrading performance in FIG. 2, one ($T^8$) associated with the light losses in the amplitude beamsplitter, and the other ($\cos^2 \alpha_E$) associated with the sensitivity of the detector to the polarization of the incoming signal. Accordingly, a need exists for a coherent light detection system which minimizes the light loss attributable to amplitude beamsplitters and the sensitivity of the detector to changes in the polarization of the light signal.

BRIEF DESCRIPTION OF THE INVENTION

In the apparatus of the present invention, both of the problems associated with the prior art are resolved by replacing the amplitude beamsplitters with polarization beamsplitters, and by providing means for either controlling the signal polarization completely, or reducing sensitivity to polarization.

Figure 3:
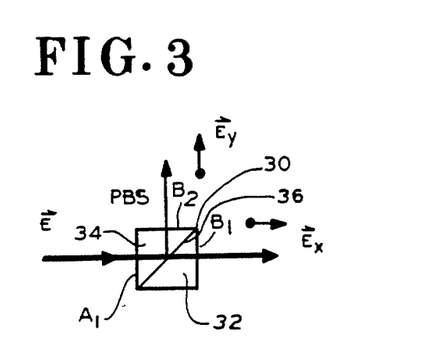
FIG. 3 depicts in schematic form a polarization beamsplitter for resolving polarized light into orthogonally polarized components.

A polarization beamsplitter (PBS) is a device which will resolve a light beam of arbitrary polarization incident on one incident face $A_1$ into two components $\vec{E}_y$ and $\vec{E}_x$ of orthogonal polarizations exiting from separate exit faces $B_1$ and $B_2$, as in FIG. 3. A typical PBS comprises a cube 30 formed of two 45° prisms 32 and 34 with an intermediate multilayer dielectric coating 36 which has been formed on the diagonal face of one of the prisms, 32 or 34, prior to their having been cemented together to form the cube 30. The coating 36 is designed to reflect one polarization and transmit the orthogonal polarization with a high degree of efficiency. The orthogonal components $\vec{E}_y$ and $\vec{E}_x$ are typically linearly polarized, but a PBS which produces orthogonally polarized pairs with other forms of polarization will work as well.

Figure 4:
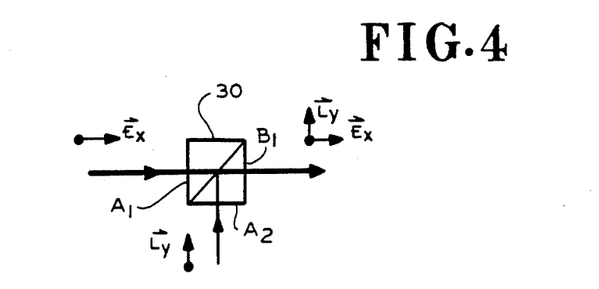
FIG. 4 depicts in schematic form a polarization beamsplitter used to mix orthogonally polarized components.

Such a beamsplitter can also be used to combine or mix two orthogonally polarized light beams $\vec{E}_x$ and $\vec{L}_y$, as shown in FIG. 4, to produce a combined light beam having mutually orthogonally polarized $\vec{L}_y$ and $\vec{E}_x$ components. The PBS 30 shown in FIG. 4 could directly replace $ABS_1$ in FIG. 2 with some minor modifications to the system, but it is capable of doing more. Thus in FIG. 5, the PBS 30 has split both $\vec{E}$ and $\vec{L}$ into orthogonally polarized components $\vec{E}_x$, $\vec{E}_y$, $\vec{L}_x$ and $\vec{L}_y$, and mixed them into orthogonally polarized pairs, $\vec{E}_x+\vec{L}_y$ and $\vec{E}_y+\vec{L}_x$. Thus the one PBS in FIG. 5 has performed the function of the three components $P_1$, R and $ABS_1$ in FIG. 2.

Figure 5:
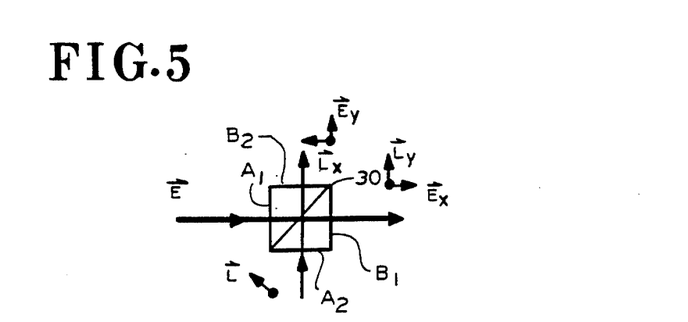
FIG. 5 depicts in schematic form a polarization beamsplitter used to simultaneously split each entering beam into two orthogonally polarized components and sort the components into two orthogonally polarized mixed pairs.

More significantly, the PBS in FIG. 5 has provided two outputs which between them contain all of the energy in the incident beams. Thus it can be used as the basis of a new system which eliminates or reduces the signal losses associated with the $\cos^2 \alpha_E$ (polarization sensitivity) term in equation (15). If $\vec{L}$ is linearly polarized, $\alpha_L$ is typically 45° for this type of mixer, so that $$\vec{E}_x=E \cos \alpha_E \cos (\omega_E t+\delta_{Ex}) \quad (16)$$

$$\vec{E}_y=E \sin \alpha_E \cos (\omega_E t+\delta_{Ey}) \quad (17)$$

$$\vec{L}_x=L \cos 45° \cos (\omega_L t+\delta_L) \quad (18)$$

$$\vec{L}_y=L \sin 45° \cos (\omega_L t+\delta_L) \quad (19)$$

Since $\cos 45° = \sin 45°$, $\vec{L}_x$ and $\vec{L}_y$ are of the same amplitude.

Figure 6:
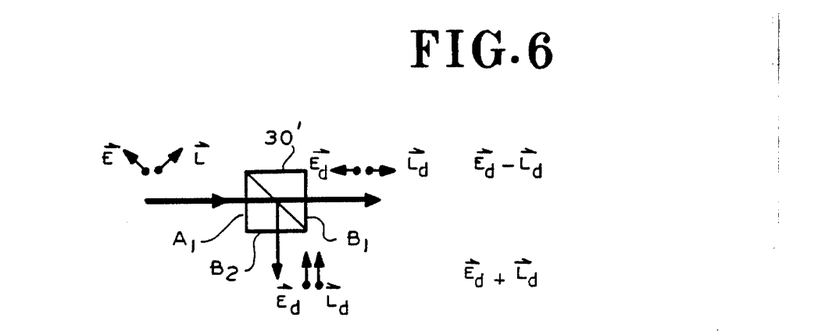
FIG. 6 depicts in schematic form a polarization beamsplitter used to split an orthogonally polarized mixed pair into sum and difference pairs.

If a pair of orthogonally polarized beams $\vec{E}$ and $\vec{L}$, such as the pair $\vec{L}_y$ and $\vec{E}_x$ exiting face $B_1$ of PBS 30 of FIG. 5, is placed incident on a second PBS 30' with its polarization direction at +45° and −45° to the plane of incidence, as shown in FIG. 6, PBS 30' will perform the same operation as was performed by the three components $ABS_2$, $P_{2+}$ and $P_{2-}$ in FIG. 2. The combination of two polarization beamsplitters can thus perform all of the mixing and splitting functions of the six optical components in FIG. 2. Moreover, feeding the output from face $B_2$ of the first PBS 30 in FIG. 5 to a third PBS (not shown), which functions in the manner of PBS 30', makes it possible to recover the additional signal components $\vec{E}_x$ and $\vec{L}_y$, further reducing the sensitivity of the detector to the polarization state of the incident modulated signal beam $\vec{E}$.

DESCRIPTION OF THE NEW INVENTION

Figure 7:
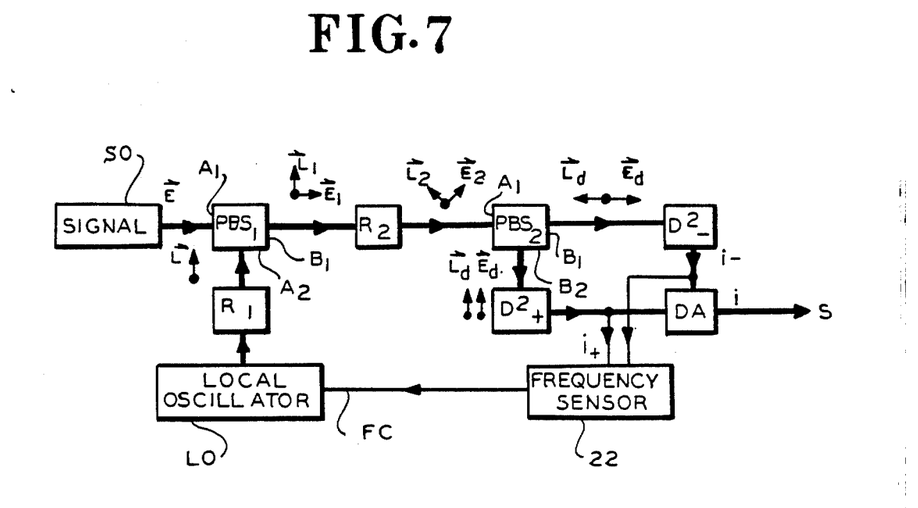
FIG. 7 is a block diagram of a one-channel embodiment of the present invention.

The apparatus of the present invention utilizes PBSs to perform the mixing and splitting functions and will be referred to generically as a polarization matching mixer (PMM). Seven embodiments of the present invention are described herein. A one-channel embodiment is shown in FIG. 7. In the PMM of FIG. 7, the signal light beam from source SO is incident on face $A_1$ of $PBS_1$. The polarization vector of the local oscillator light beam from local oscillator LO is rotated by rotator $R_1$ so that the electric field vector $\vec{L}$ incident on face $A_1$ of $PBS_1$ is oriented such that $\alpha_L=0°$. $PBS_1$ operates as described in connection with FIG. 4 to mix the two incident light beams $\vec{E}$ and $\vec{L}$ to produce a combined light beam at exit face $B_1$ having orthogonally polarized components $\vec{L}_1$ and $\vec{E}_1$. The local oscillator component $\vec{L}_1$ has an amplitude $L_1 = L \cos \alpha_L = L$, since $\alpha_L$ was set to $0°$; in vector notation, $\vec{L}_1 = \vec{L}$. The signal component $\vec{E}_1 = \vec{E} \cos \alpha_E$.

In order to present the mixed beam $\vec{L}_2 + \vec{E}_2$ to $PBS_2$ in a form which allows $PBS_2$ to operate in the manner of PBS 30' of FIG. 6, it is necessary either to rotate the polarization vectors of the mixed beam with rotator $R_2$, or to rotate the assembly containing $PBS_2$ and square law detectors $D^2_+$ and $D^2_-$ with respect to $PBS_1$, until $\alpha_{L2}$ and $\alpha_{E2}$ are 45° measured with respect to the plane of incidence of $PBS_2$. Both procedures are equivalent, although elimination of the rotation will give slightly higher transmissions. Rotators are shown in the figures for graphical convenience, since this allows the optical paths to be layed out in a single plane. In FIG. 7, the amplitudes of $\vec{L}_2$ and $\vec{E}_2$ are equal respectively to the amplitudes of $\vec{L}_1$ and $\vec{E}_1$, and only the directions of polarizations have been rotated by $R_2$.

$PBS_2$ operates as described in FIG. 6 to split the orthogonally polarized mixed pair $\vec{L}_2 + \vec{E}_2$ into equal amplitude sum and difference pairs, the difference pair $\vec{E}_d - \vec{L}_d$ exiting from face $B_1$ of $PBS_2$ to go to square law detector $D^2_-$, and the sum pair $\vec{E}_d + \vec{L}_d$ exiting from face $B_2$ of $ABS_2$ to go to square law detector $D^2_+$, properly phased for difference detection. Because $\alpha_{L2}$ and $\alpha_{E2}$ both equal 45°, $$\vec{E}_d = \vec{E} \cos 45° \cos \alpha_E \qquad (20)$$

$$\vec{L}_d = \vec{L} \cos 45° \qquad (21)$$

By analogy to equations (3) through (9), the output current from DA is $$i = 2DEL \cos^2 45° \cos \alpha_E \cos[(\omega_E - \omega_L)t + (\delta_E - \delta_L)] \qquad (22)$$

and, noting that $\cos^2 45° = 0.5$, the ouput signal is $$S = CD^2E^2L^2 \cos^2 \alpha_E. \qquad (23)$$

The frequency sensor 22 in FIG. 7 generates a control signal FC which is used to control the frequency $\omega_L$ of the local oscillator LO in exactly the same manner as the frequency sensors 22 in FIGS. 1 and 2.

Comparing equation (23) to equation (15) shows that the embodiment of FIG. 7 outperforms the prior art embodiment of FIG. 2 by a factor of 16 or more, the exact value being dependent on the efficiency of the ABSs used in FIG. 2, for a signal gain of at least 12 db.

Figure 8:
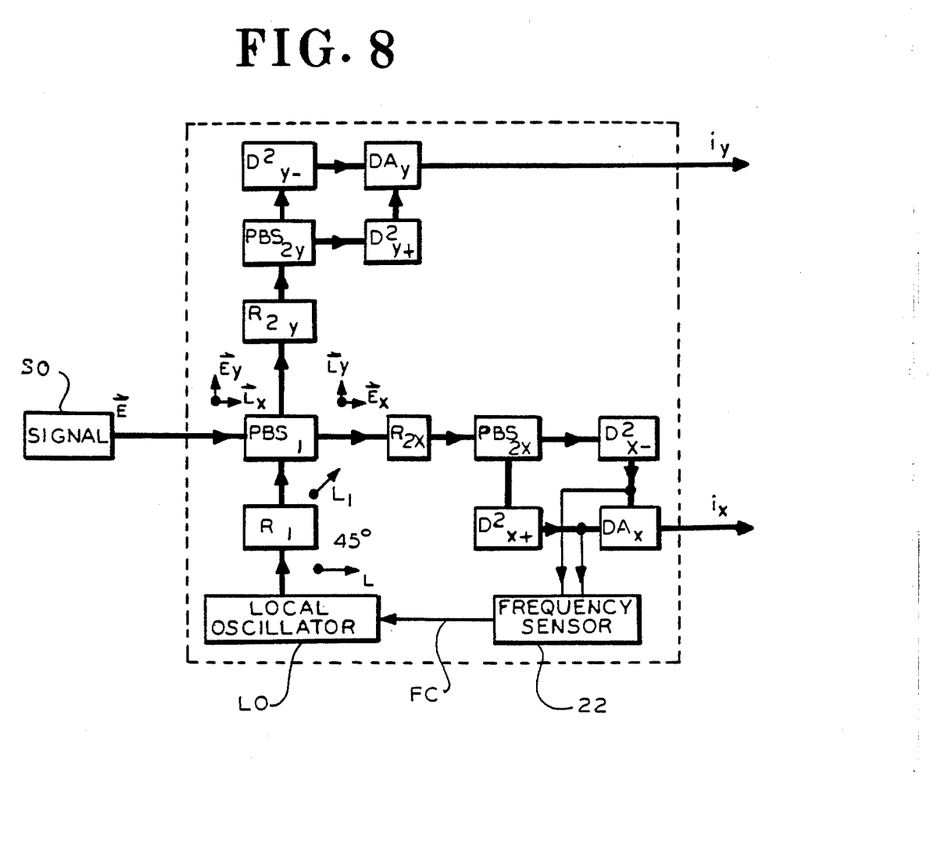
FIG. 8 is a block diagram showing a core common to all two-channel embodiments of the present invention.

In the one-channel embodiment of FIG. 7, S is dependent on $\cos^2 \alpha_E$, and thus on the polarization of $\vec{E}$. The remaining embodiments of the present invention take advantage of the second output of $PBS_1$ to reduce or eliminate the sensitivity to polarization. FIG. 8 shows the core of the essential elements of these two-channel embodiments within the dashed lines. A description of how these core elements function will be given once, below, and not repeated in describing subsequent embodiments of two-channel PMMs.

In FIG. 8, $PBS_1$ splits $\vec{E}$ from source SO into $\vec{E}_x$ and $\vec{E}_y$ with values given by equations (16) and (17). $R_1$ rotates the polarization vector of $\vec{L}$ so that for $\vec{L}_1$, $\alpha_L = 45°$, so that $\vec{L}_x$ and $\vec{L}_y$ have the values given by equations (18) and (19). The remaining components $R_2$, $PBS_2$, $D^2_+$, $D^2_-$ and DA are identical in the x- and y-channels, and function in exactly the same manner as in the FIG. 7 embodiment. The x- and y-channels therefore produce output currents $i_x$ and $i_y$, where $$i_x = 2DEL \cos^3 45° \cos \alpha_E \cos[(\omega_E - \omega_L)t + (\delta_{Ex} - \delta_L)] \qquad (24)$$

$$i_y = 2DEL \cos^3 45° \sin \alpha_E \cos[(\omega_E - \omega_L)t + (\delta_{Ey} - \delta_L)]. \qquad (25)$$

The corresponding signal levels are $$S_x = 0.5CD^2E^2L^2 \cos^2 \alpha_E \qquad (26)$$

$$S_y = 0.5CD^2E^2L^2 \sin^2 \alpha_E \qquad (27)$$

Comparison between equations (26) and (23) shows that the FIG. 7 embodiment produces twice (+3 db) the signal of the x-channel in FIG. 8. If $\alpha_E \geq 45°$, the output of the y-channel exceeds that of the x-channel, and as $\alpha_E$ increases, it will eventually exceed the output of the FIG. 7 embodiment at the same value of $\alpha_E$.

Figure 9:
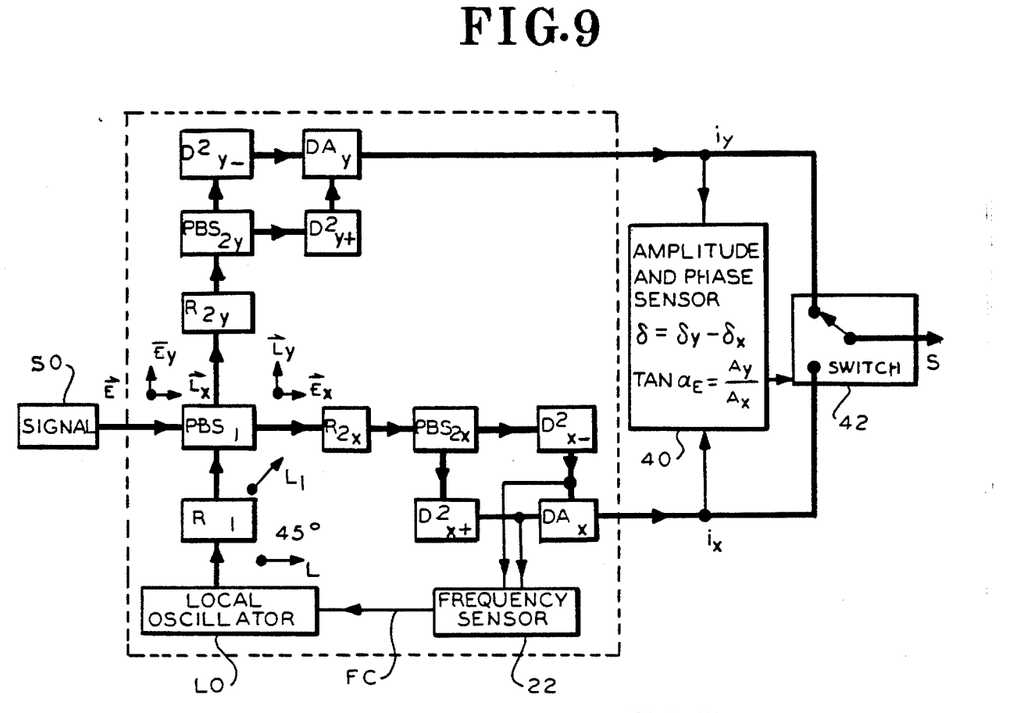
FIG. 9 is a two-channel switcher embodiment of the present invention.

In FIG. 9, the simplest two-channel embodiment of the invention is shown. In this embodiment an electronic sensor 40, which compares $i_x$ to $i_y$ using standard electronic procedures to measure amplitude and relative phase, is added to the core elements of FIG. 8. Sensor 40 controls electronic switch 42, which chooses the output from whichever channel has the largest amplitude signal current, $i_x$ or $i_y$. Thus no matter what happens to the polarization, the signal loss is no greater than $-3$ db, compared to the signal for $\alpha_E = 0°$ or $90°$. Compared to the maximum possible signal from the one-channel embodiment of FIG. 7, which occurs at $\alpha_E = 0°$, the FIG. 9 embodiment has signal levels ranging from $-3$ db to $-6$ db.

The output currents can be defined as $i_x = A_x \cos(\omega t + \delta_x)$ and $i_y = A_y \cos(\omega t + \delta_y)$, where $\omega = \omega_E - \omega_L$, $\delta_x = \delta_{Ex} - \delta_L$, and $\delta_y = \delta_{Ey} - \delta_L$. $A_x$ is directly proportional to $E \cos \alpha_E$ and $A_y$ is directly proportional to $E \sin \alpha_E$. Both x- and y-channel $\vec{E}$- and $\vec{L}$-components were formed and mixed at the same point in $PBS_1$, and thus the phase relationships between $\vec{E}$- and $\vec{L}$-components remain stable throughout the optical system. In this case, the phase difference between $i_x$ and $i_y$, $\delta_i = \delta_x - \delta_y$ will match $\delta = \delta_{Ex} - \delta_{Ey}$. The ratio of the measured amplitudes, $\alpha_i = \arctan A_y/A_x$, is also identical to $\alpha_E = \arctan E_y/E_x$. Thus measuring the amplitude and relative phase of $i_x$ and $i_y$ yields all the information needed to control the polarization of E, or at least to offset the losses seen in single channel coherent detectors. There are numerous ways of doing this. The following five embodiments of the PMM invention illustrate specific techniques for doing this, but the invention is not intended to be limited to these five.

Figure 10:
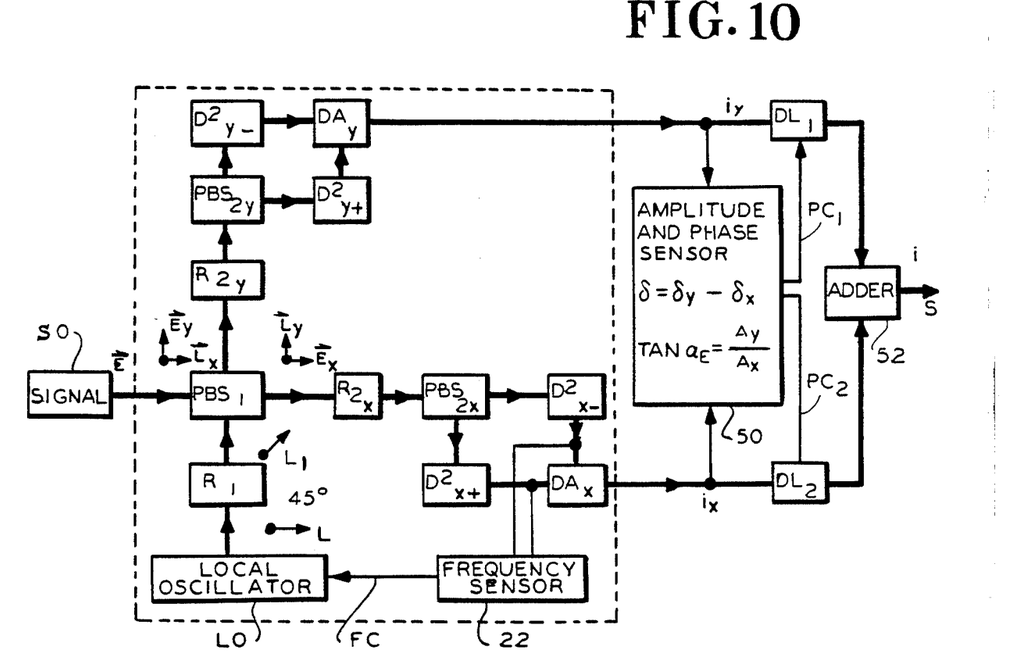
FIG. 10 is a two-channel electronic delay and add embodiment of the present invention.

In the embodiment shown in FIG. 10, the relative phase of the two signal currents $i_x$ and $i_y$ is measured in amplitude and phase sensor 50 and is used to generate phase control signals $PC_1$ and $PC_2$ which control delay lines $DL_1$ and $DL_2$ to bring $i_x$ and $i_y$ into phase. (Delay lines are used in both channels, since there is no apriori knowledge as to which is delayed with respect to the other.) The two signal currents are then added in adder 52 to give a net output current $$i = 2DEL \cos^3 45° \cos(\omega t + \delta)(\cos \alpha_E + \sin \alpha_E) \quad (28)$$

and a signal level $$S = 0.5 CD^2 E^2 L^2 (\cos \alpha_E + \sin \alpha_E)^2. \quad (29)$$

Equation (29) reaches a maximum when $\alpha_E = 45°$. At this point, it matches the signal level reached by the one-channel embodiment of FIG. 7 when $\alpha_E = 0°$. When $\alpha_E = 0°$ or $90°$, equation (29) drops to 0.5 of the peak value ($-3$ db). Thus over the entire polarization range $0° \leq \alpha_E \leq 90°$, the apparatus of FIG. 10 produces signal levels within 3 db of that produced by the FIG. 7 embodiment at $\alpha_E = 0°$.

Figure 11:
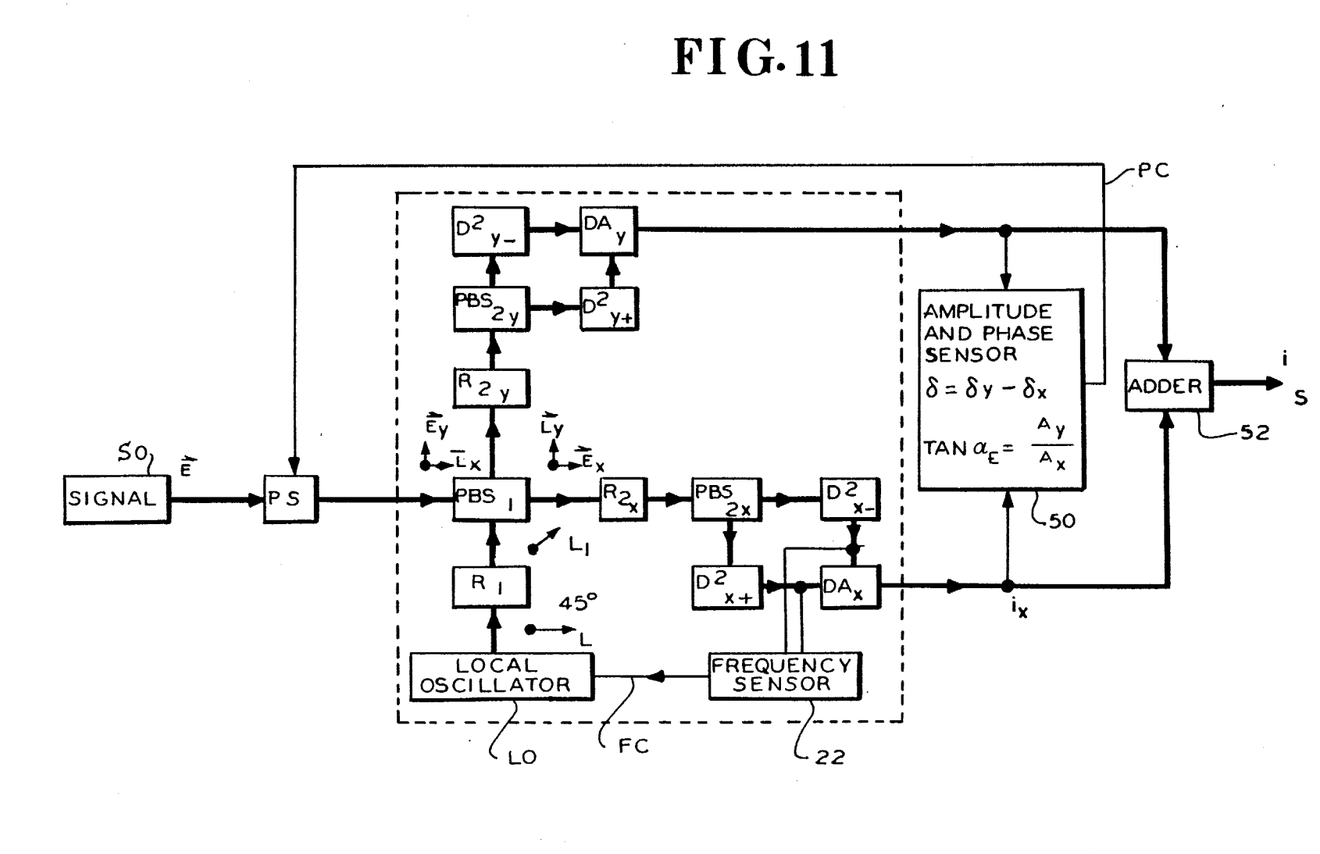
FIG. 11 is a two-channel optical delay and add embodiment of the present invention.

In the apparatus shown in FIG. 11, the phase control signal PC from the amplitude and phase sensor 50 is used to control an optical phase shifter PS in the input signal beam. The optical phase shifter may be an opto-mechanical device such as a Soleil compensator, an electro-optical device based on the Pockels effect, or any similar device which permits retardation of one polarization component relative to the orthogonal component in a time interval compatible with the rate at which the polarization state of $\overline{E}$ changes. PS performs exactly the same function as the delay lines in the FIG. 10 embodiment, matching the phase of the signal currents. The net output current achieved by adding $i_x$ and $i_y$ will also be identical, so the signal levels will match those of FIG. 10 at every value of $\alpha_E$.

Figure 12:
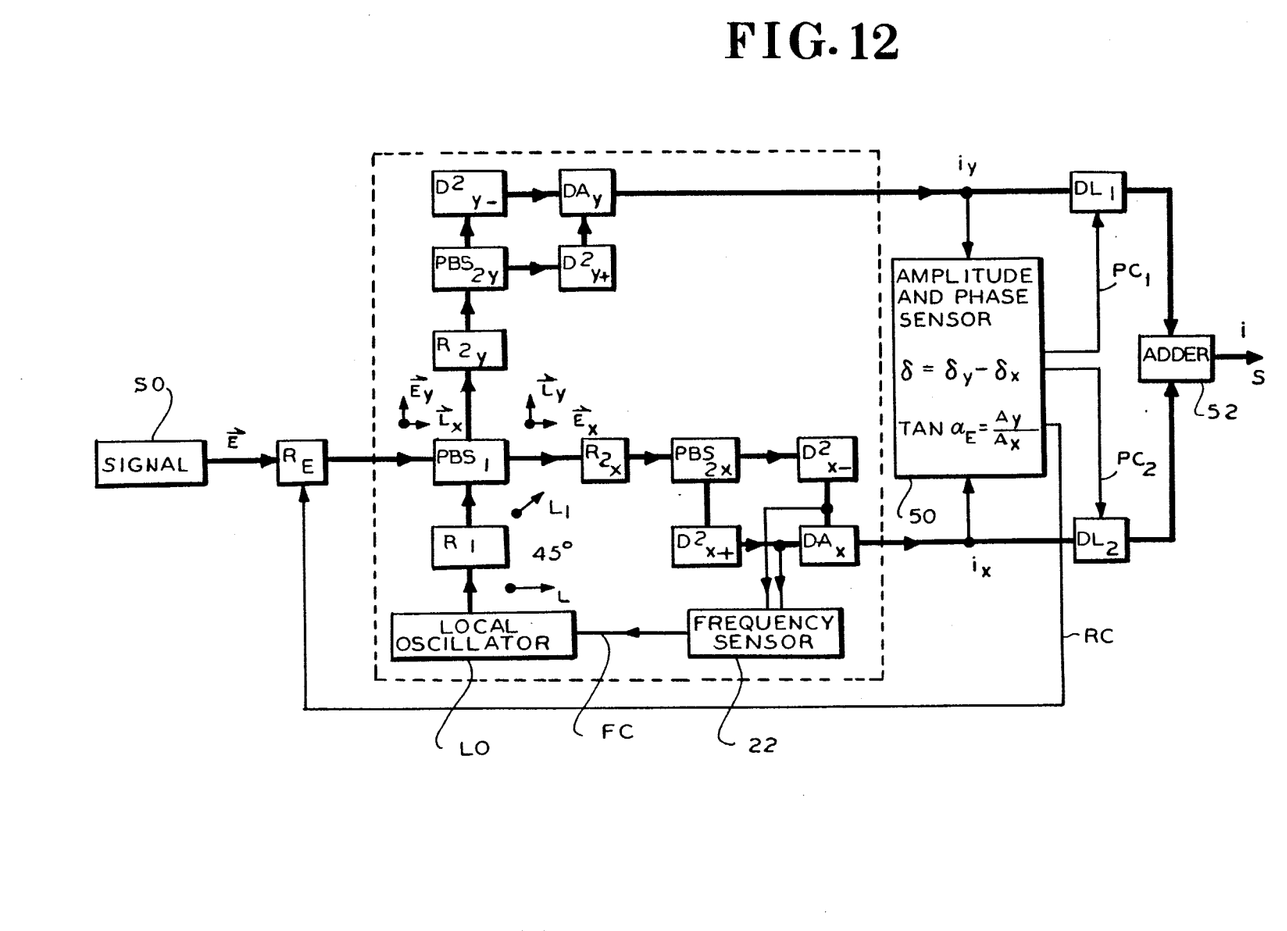
FIG. 12 is a two-channel electronic delay and optical rotate and add embodiment of the present invention.

In FIG. 12, the amplitude and phase sensor generates phase correction signals $PC_1$ and $PC_2$ which control delay lines $DL_1$ and $DL_2$ to match the phases of $i_x$ and $i_y$, as in FIG. 10. In FIG. 12, however, a rotator $R_E$ has been inserted in the input signal path. The amplitude and phase sensor 50 also generates a rotation control signal RC which causes $R_E$ to rotate the polarization ellipse until $E \cos \alpha_E = E \sin \alpha_E$, that is, until $\alpha_E = 45°$. Adding $i_x$ and $i_y$ now produces the maximum possible signal, matching that achieved in FIG. 7 when $\alpha_E = 0°$, but for any input polarization state. The rotator $R_E$ may be an opto-mechanical device such as a half-wave retarder which is mechanically rotated an angle $\alpha_E/2$ to rotate the polarization vector through $\alpha_E$, an electro-optical device based on the Faraday effect which rotates the polarization vector by imposing a magnetic field on a suitable material, or any other device which can rotate the polarization ellipse the requisite amount in an interval compatible with the rate at which the polarization state $\overline{E}$ changes.

Figure 13:
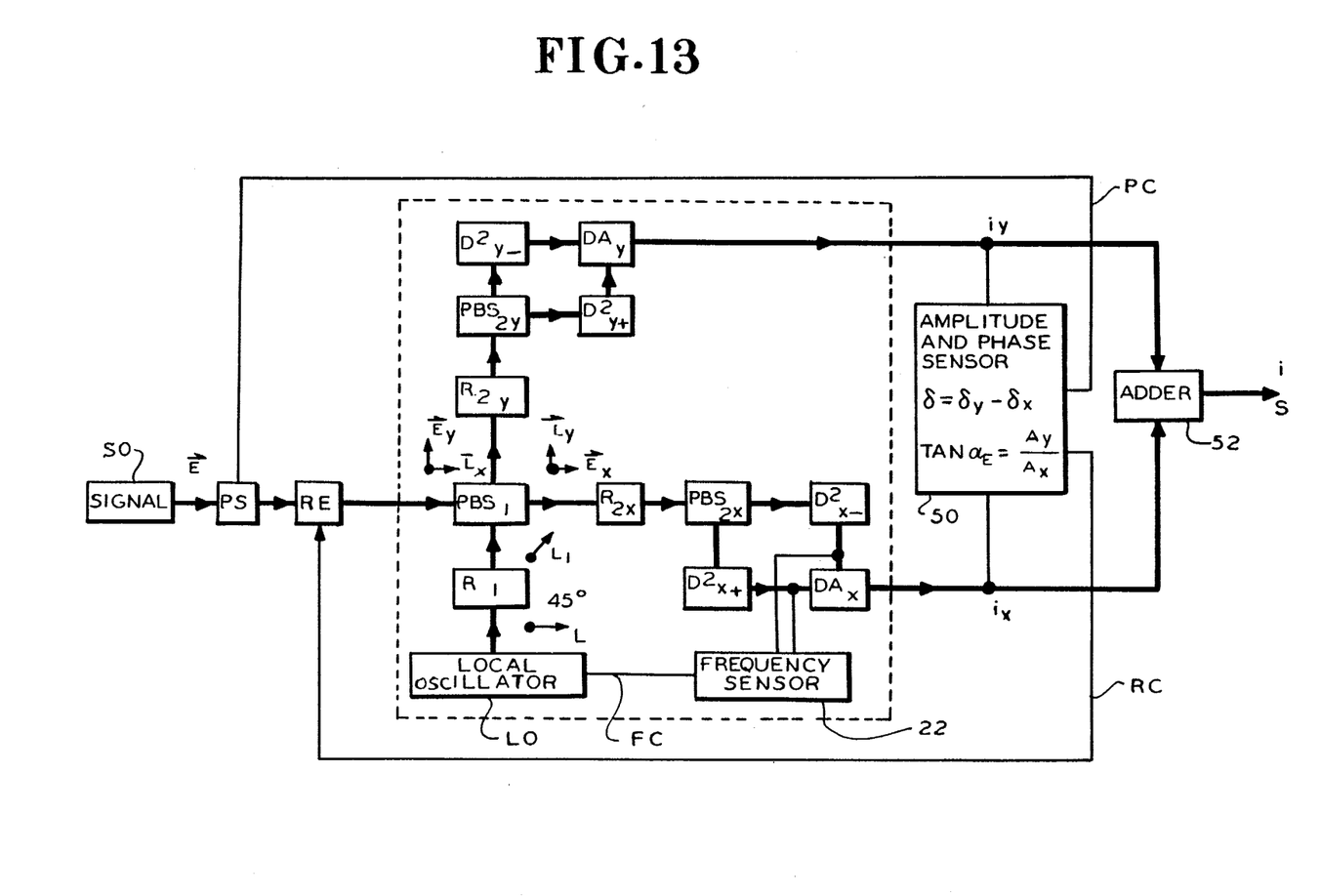
FIG. 13 is a two-channel optical delay, optical rotate and add embodiment of the present invention.

The apparatus of FIG. 13 accomplishes the same end as FIG. 12 using optical components PS and $R_E$ in the signal to introduce both phase matching and rotation of the polarization vector to $\alpha_E = 45°$, PS and $R_E$ being controlled respectively by the signals PC and RC generated by the amplitude and phase sensor 50. Again, $i_x$ and $i_y$ are added, giving the optimum possible signal output current $i$ for initial polarization states of $\overline{E}$.

Figure 14:
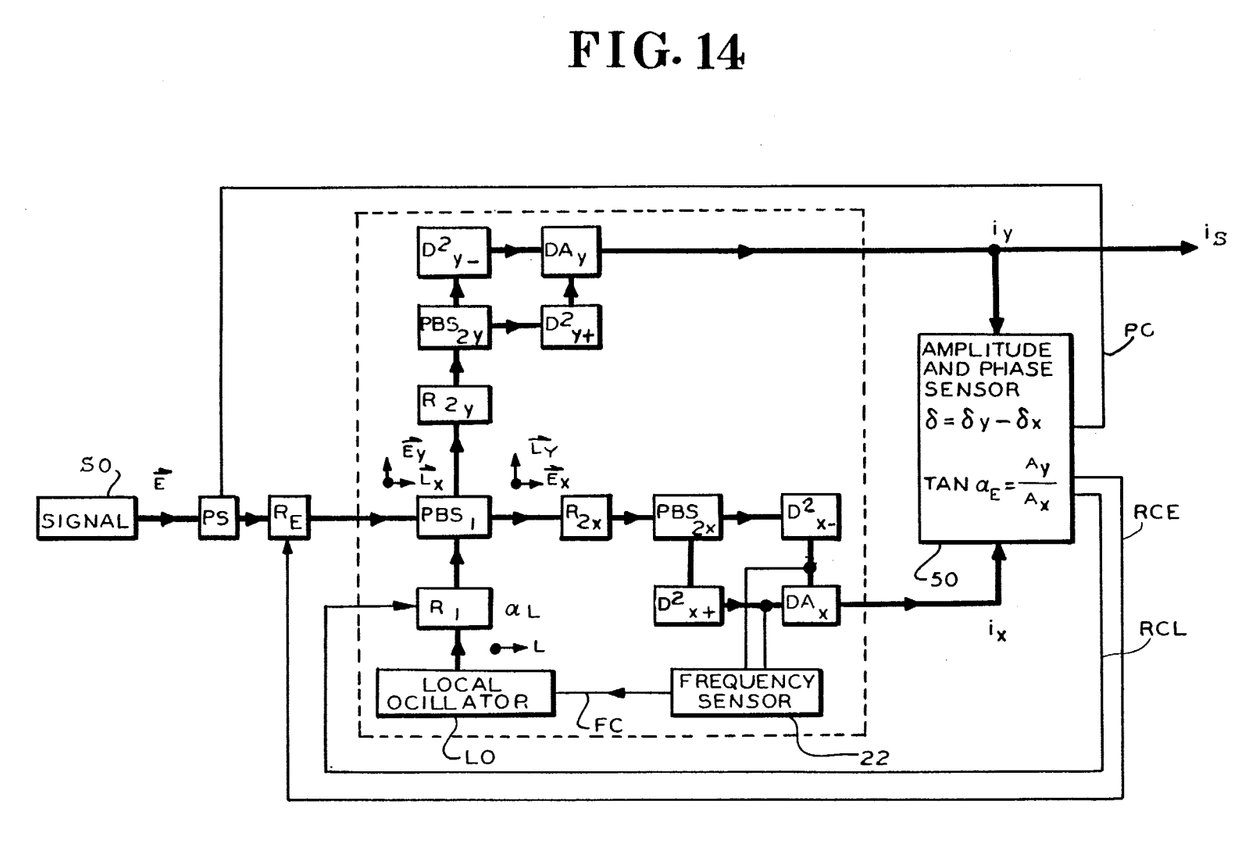
FIG. 14 is a two-channel optical delay and rotate embodiment which routes major fractions of $\vec{E}$ and $\vec{L}$ to one channel and uses the other channel for polarization sensing and control.

The apparatus of FIG. 14 achieves the maximum output possible independent of signal polarization in a manner slightly different from the FIG. 12 and FIG. 13 embodiments. In FIG. 14, the x-channel output current $i_x$ is used strictly as one input to the electronic device 50 which measures phase difference and amplitude ratio. The electronic device 50 produces three control signals, PC, which controls the optical phase shifter PS, RCE, which controls the input signal rotator $R_E$, and RCL, which controls the local oscillator rotator $R_1$. PS and $R_E$ are adjusted to divert the maximum possible fractions of $\overline{E}$ and $\overline{L}$ into the y-channel. The x-channel receives only the minimum energy from $\overline{E}$ and $\overline{L}$ to perform the polarization state analysis needed to generate the control signals. (Since the phase and amplitude ratio are measured for the carrier frequency stripped of its signal modulation, the power required in the x-channel should be substantially less than in the y-channel.) The relative split between x and y can be varied with time, dependent on the needs of the moment (more might be needed in the x-channel during the initial stages of signal acquisition, for example, for the polarization state of $\overline{E}$ has been determined.)

It should be noted that the form of signal modulation has not been mentioned at any time in discussing the invention. All embodiments of the polarization matching mixer can be used with any form of modulation. The principal functions of the polarization matching mixer are to eliminate signal losses in the optics associated with the polarization state of the signal and to manipulate the polarization state to maximize the efficiency of differential heterodyne and homodyne detection. There may or may not be added gains in signal level or signal-to-noise ratios achievable through use of particular modulation techniques such as phase keying. These will come as additions to the signal-to-noise ratio gains achieved by making the optical system more efficient.

One example of prior art, Henning's U.S. Pat. No. 3,694,656, has been discussed in some depth. There is another example of prior art, U.S. Pat. No. 4,506,388, invented by Monerie and Leclert, which bears a superficial resemblance to the embodiment of FIG. 10. There are fundamental difference between Monierie, et. al. and any of the PMM embodiments, even though Monerie, et. al. is also insensitive to the polarization state of the signal. The principal difference is that Monerie, et. al. works only with phase key modulation, while all PMM embodiments described here can be used with any form of modulation. Monerie, et. al. is also significantly less efficient optically.

Figure 15:
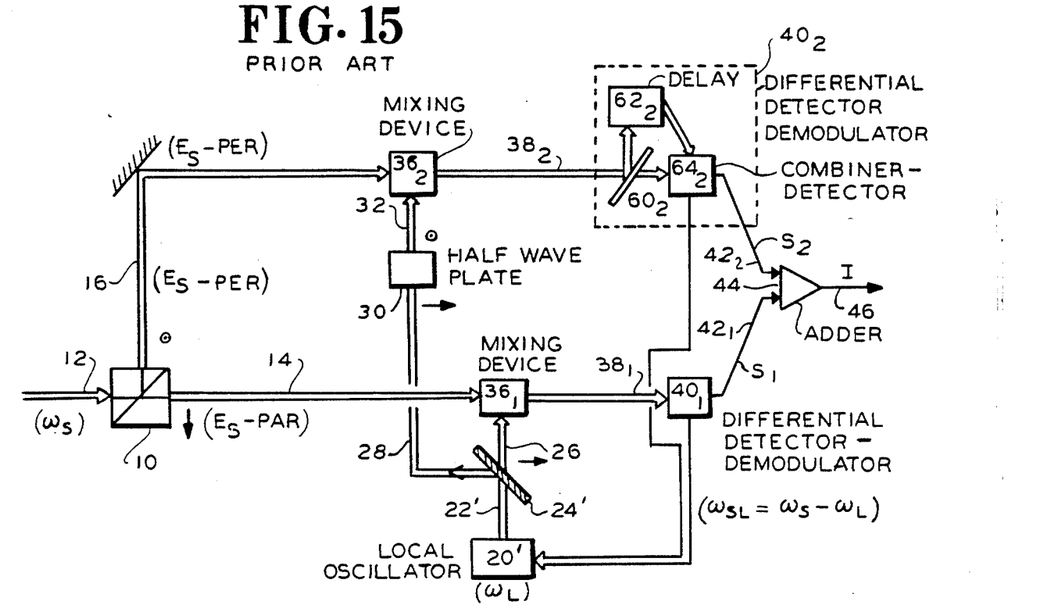
FIG. 15 is a block diagram of the prior art system of U.S. Pat. No. 4,506,388.

In Monerie, et. al., the entering signal, $\omega_s$ in FIG. 15, is fed into a PBS (10) which divides it into components polarized perpendicular ($E_{s\text{-}per}$) and parallel ($E_{s\text{-}par}$) to the plane of incidence. PBS (10) is not used to mix the signal ($\omega_S$) with the local oscillator signal ($\omega_L$). Instead, the local oscillator signal is split into two equal components by ABS 24' and directed to separate ABS mixers in each channel ($36_1$ and $36_2$). A half-wave plate 30 is used to rotate the polarization vector of the local oscillator in one channel, so that after the signal and local oscillator are mixed in each channel, their polarization vectors will be matched. Each signal/local oscillator mix is fed to a device referred to as a "differential detector-demodulator" ($40_1$ and $40_2$). This operates on a different principal than the corresponding differential detectors of the present invention.

In FIG. 10, advantage is taken of the orthogonal polarization states in the light beam exiting from PBS$_1$ to split the signal/local oscillator mix into sum and difference pairs using PBS$_2$. This cannot be done in Monerie, et. al., because the polarizations of signal and local oscillator are already matched. Instead, the signal is split into equal components by an ABS (60$_2$), and the two resulting beams are added back together after one of them has been delayed by a period of time $\Delta t$. The manner in which the beams are recombined is not described in detail, although it appears from FIG. 15 that this occurs in the optical domain. This could be done, for example, with an unequal path length Mach-Zehnder interferometer. This device will cause interference between the two nominally identical mixed beams sampled at times $t_1$ and $t_2=t_1+\Delta t$ and produce two output beams which will remain of fixed intensity so long as the phase term $\delta_E$ remains fixed. If $\delta_E$ is altered, however, the output of the Mach-Zehnder interferometer will alter in the interval between $t_1$ when the phase change has passed through the short arm of the interferometer and the time $t_2$ when the phase change has passed through the second arm. It is possible, for example, to switch the signal-component of the mixed beam in its entirety from one interferometer output to the other.

Monerie and Leclert have analyzed the performance of their device in a manner which will allow a direct comparison of its optical efficiency to the system of FIG. 2 and the embodiments of the present invention. In this comparison, it is assumed that the amplitude transmittances and reflectances of the ABSs are set equal to maximize the signal level, so that $U=V=T$. Their analysis defined the local oscillator amplitude 1 at a point after ABS (24) in FIG. 15. We will correct for this by noting that $1=TL$. If E and $\alpha_E$ define the signal amplitude and polarization and $\Delta\delta$ defines the change in phase $\delta_E$ [used as the signal modulation], Monerie and Leclert's signal level equations for the two channels become $$S_y = E^2L^2T^6 \cos^2 \alpha_E \cos \Delta\delta \qquad (30)$$

$$S_x = E^2L^2T^6 \sin^2 \alpha_E \cos \Delta\delta. \qquad (31)$$

Monerie and Leclert add these to get a net signal $$S = E^2L^2T^6 \cos \Delta\delta \leq (E^2L^2 \cos \Delta\delta)/8, \qquad (32)$$

which is completely independent of the polarization state. It should be noted that Monerie and Leclert have not included any terms to represent optical losses occurring within their differential detector-demodulators, which may reduce the signal to levels significantly below that of equation (32).

It is not absolutely clear that it is legitimate to add $\cos^2 \alpha_E = \sin^2 \alpha_E$ rather than $(\cos \alpha_E + \sin \alpha_E)^2$, but equation (32) will be used as is for signal level comparisons. The "differential" detector-demodulator in Monerie, et. al. adds the outputs at combiner-detector 64$_2$, even if they are time-shifted. It is therefore not clearly apparent that the direct current terms equivalent to $E^2$ and $L^2$ in equations (6) and (7) are eliminated from the photon shot noise. This factor will be ignored, and the performance comparison will be made solely on the basis of the terms which are known to contribute to degradation of the signal level. Equation (32) indicates a level of performance 9 db below that of the apparatus of FIG. 10 at its peak ($\alpha_E=45°$), as indicated by equation (29).

Figure 16:
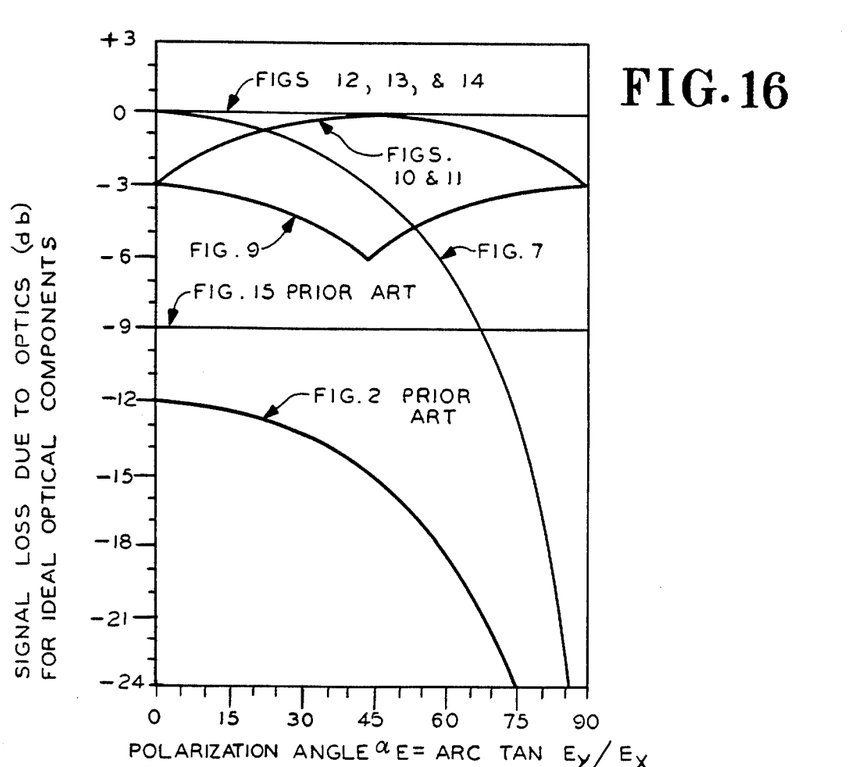
FIG. 16 is a performance comparison of two examples of the prior art with the seven embodiments of the polarization matching mixer of the present invention.

FIG. 16 compares the signal levels of the prior art systems of FIG. 2 and FIG. 15 to those for all seven embodiments of the present invention discussed above, for all possible polarization states. This comparison deals solely with the losses directly related to the amplitude beamsplitters and to the initial polarization state of the signal E, and assumes other optical losses to be small and of similar magnitude for the systems being compared. It is believed that the actual differences are not enough to change the relative performances by more than the order of 0.5 to 1.0 db.

The system most closely related to FIG. 2 is FIG. 8, which exceeds the performance of FIG. 2 by 12 db. FIG. 9 exceeds the optical performance of FIG. 15 by 3 to 6 db. FIGS. 10 and 11 exceed the optical performance of FIG. 15 by 6 to 9 db. FIGS. 12, 13 and 14 exceed the optical performance of FIG. 15 by 9 db.

Equivalents

While the above described embodiments are preferred, other configurations will be readily apparent to those skilled in the art and, thus, the invention is only to be limited in scope by the language of the following claims and equivalents.

What is claimed is:

1. Apparatus for coherent detection of a modulated light wave signal comprising:
   (a) a local oscillator for generating a local oscillator light wave signal;
   (b) a first means responsive to said modulated light wave signal and said local oscillator light wave signal for producing a first channel combined light beam signal having two mutually orthogonally polarized components, one derived from said modulated light wave signal and the other generated from said local oscillator light wave signal;
   (c) a second means responsive to said combined light beam signal for splitting the beam of mutually orthogonally polarized components into two respective light beams comprising the sum of said components and the difference of said components;
   (d) a first square law detector coupled to the sum component light beam for detecting the intensity of the sum component light beam and producing a sum current proportional thereto;
   (e) a second square law detector coupled to the difference component light beam for detecting the intensity of the difference component light beam and producing a difference current proportional thereto;
   (f) a first differential means for providing a first net current signal proportional to the difference between the sum and difference circuits; and
   (g) a frequency control means for sensing the frequency of said sum current and said difference current and adjusting the oscillation frequency of said local oscillator to maintain the frequency of said sum current and said difference current at a preselected value.

2. The apparatus of claim 1, in which said frequency control means maintains the frequency of said sum current and said difference current in the radio frequency range.

3. The apparatus of claim 1, in which said frequency control means adjusts the frequency of said local oscillator light wave signal to the frequency of said modulated light wave signal to maintain the frequency of said sum current and said difference current at zero.

4. The apparatus of claim 1 wherein said first means also produces a second channel combined light signal having two mutually orthogonally polarized components composed of the residuals of said modulated light wave signal and said local oscillator light wave signal not used in generating said first channel combined light beam and;
   (a) a third means responsive to said second channel combined light signal for splitting the beam of mutually orthogonally polarized components thereof into two respective light beams comprising the sum of said components and the difference of said components;
   (b) a third square law detector coupled to said second channel sum component light beam for detecting the intensity of the sum component light beam and producing a sum current proportional thereto;
   (c) a fourth square law detector coupled to the second channel difference component light beam for detecting the intensity of the difference component light beam and producing a difference current proportional thereto; and
   (d) a second difference means for providing a second net current signal proportional to the difference between the sum and difference currents of said second channel.

5. The apparatus of claim 4 including switching means for selecting whichever net current signal has the greatest amplitude.

6. The apparatus of claim 4 further including sensor means for determining the relative phase and amplitude ratios of said first and second net current signals.

7. The apparatus of claim 6 further including delay means for matching the phase of the first and second net current signals and adder means for adding said first and second net current signals.

8. The apparatus of claim 6 further including rotator means for rotating the polarization state of the modulated light wave signal in response to the relative amplitudes sensed by said sensor means and means for adding said first and second net current signals.

9. The apparatus of claim 8 wherein said rotator means rotates said polarization state until the arc tangent of the ratio is 45°.

10. The apparatus of claim 6 further including phase shifter means for adjusting the phase of the modulated light wave signal in response to the relative phase ratio sensed by said sensor means to match the phase of said first and second net current signals.

11. The apparatus of claim 4 including sensor means for determining the relative phase amplitude ratios of said first and second net current signals; and means responsive thereto for adjusting the phase and polarization state of the modulated light wave signal to direct the maximum possible fractions of the modulated light wave signal and local oscillator light wave signal into one of said first and second channels.

12. The apparatus of claim 4 wherein the first and second means each comprise:
   (a) a polarization beamsplitter having first and second incident faces and first and second exit faces and polarizing means for separating light waves incident on the incident faces into two light waves polarized orthogonal to each other and directing said separated light waves out of separate exit faces in accordance with the polarization state of the separated light waves.

13. The apparatus of claim 4 further including phase detector means for determining the phase difference between the two net current signals and minimizing such phase differences and adding the signals together and selecting between each of the two separate signals or the added signals.

14. The apparatus of claim 4 including phase detector means for detecting the phase difference between the two detected signals and generating a phase difference signal for minimizing the phase difference between the local oscillator wave and the modulated wave.

15. Apparatus for detection of a modulated light wave signal incident on a first incident face of a first polarization beamsplitter comprising:
   (a) a first polarization beamsplitter having said first incident face and a second incident face and first and second exit faces and polarizing means for separating light waves incident of the incident faces into two light waves, each having two components polarized orthogonal to each other and directing said separate light waves out of separate exit faces;
   (b) a local oscillator for transmitting a local oscillator light wave onto the second of said incident faces of said first polarization beamsplitter wherein it is split into two light waves, each having mutually orthogonal polarization component states of said modulated light wave signal and said oscillator light wave, with one of said two light waves exiting the first exit face and the other exiting the second exit face;
   (c) a second polarization beamsplitter having an incident face and first and second exit faces and polarizing means for separating the light waves exiting from the first exit face of said first polarization beamsplitter and onto the incident face of said second polarization beamsplitter where it is split into two light waves, one of which comprises the sum of said components and the other of which comprises the difference of said components;
   (d) a third polarization beamsplitter having an incident face and first and second exit faces and polarizing means for separating the light wave exiting from the second exit face of said face polarization beamsplitter and onto the incident face of said third polarization beamsplitter where it is split into two light waves, one of which comprises the sum of said components and the other of which comprises the difference of said components;
   (e) a first square law detector responsive to the intensity of the sum light wave from said second polarization beamsplitter for producing a first sum current signal;
   (f) a second square law detector responsive to the intensity f the difference light wave from said second polarization beamsplitter for producing a first difference current;
   (g) a third square law detector responsive to the intensity of the sum light wave from said third polarization beamsplitter for producing a second sum current signal;
   (h) a fourth square law detector responsive to the intensity of the difference light wave from said third polarization beamsplitter for producing a second difference current signal;
(i) a first differential detector responsive to the first sum and difference current signals to produce a first net current signal; and
(j) a second differential detector responsive to the second sum and difference current signals to produce a second net current signal.

16. The apparatus of claim 14 wherein selector means are provided for selecting between either of the two net current signals or the sum of the two signals, whichever provides the lowest signal-to-noise ratio.

17. The apparatus of claim 15 wherein a selector means is provided comprising a phase detector to detect the phase difference between the two net current signals and to adjust the relative phase of the incoming light wave to the phase of the local oscillator wave to make them coincide.

* * * * *